United States Patent
Ahmed et al.

(10) Patent No.: US 10,331,481 B2
(45) Date of Patent: *Jun. 25, 2019

(54) AUTOMATIC RECONFIGURATION OF HIGH PERFORMANCE COMPUTING JOB SCHEDULERS BASED ON USER BEHAVIOR, USER FEEDBACK, AND JOB PERFORMANCE MONITORING

(71) Applicant: International Business Machines Corporation, Armonk, NY (US)

(72) Inventors: Khalid Ahmed, Markham (CA); Renato Luiz de Freitas Cunha, Sao Paulo (BR); Marco A.S. Netto, Sao Paulo (BR); Eduardo R. Rodrigues, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/453,009

(22) Filed: Mar. 8, 2017

(65) Prior Publication Data

US 2018/0260242 A1 Sep. 13, 2018

(51) Int. Cl.
  *G06F 9/46* (2006.01)
  *G06F 9/48* (2006.01)
  (Continued)

(52) U.S. Cl.
  CPC .......... *G06F 9/4881* (2013.01); *G06F 9/5005* (2013.01); *G06F 11/3017* (2013.01); *G06F 11/3442* (2013.01)

(58) Field of Classification Search
  None
  See application file for complete search history.

(56) References Cited

U.S. PATENT DOCUMENTS

| | | |
|---|---|---|
| 7,984,445 B2 | 7/2011 | Benedetti |
| 8,171,481 B2 | 5/2012 | Benedetti et al. |
| 8,365,181 B2 | 1/2013 | Flower et al. |

(Continued)

FOREIGN PATENT DOCUMENTS

EP 0647903 A1 4/1995

OTHER PUBLICATIONS

List of IBM Patents or Patent Applications Treated as Related, dated Nov. 17, 2017, 2 pages.

(Continued)

*Primary Examiner* — Wissam Rashid
(74) *Attorney, Agent, or Firm* — Scully, Scott, Murphy & Presser, P.C.; Grant Johnson

(57) ABSTRACT

A job in a high performance computing system is executed according to a current scheduler configuration. The job is monitored to determine the job's actual resource usage, the job's performance metric and the job's completion. Responsive to determining that the job completed executing, a difference is computed between allocated resources allocated according to the current scheduler configuration at job submission for execution on the high performance computing system and the job's actual resource usage at the job's completion, wherein the difference is computed for each of N number of jobs that complete executing on the high performance computing system, wherein all of the N number of jobs are associated with a given user. Responsive to determining that the difference for said each of N number of jobs meets a criterion, the current scheduler configuration is automatically reconfigured to reduce the allocated resources for the jobs associated with the given user.

13 Claims, 3 Drawing Sheets

(51) Int. Cl.
  G06F 11/34 (2006.01)
  G06F 11/30 (2006.01)
  G06F 9/50 (2006.01)

(56) References Cited

U.S. PATENT DOCUMENTS

| | | | |
|---|---|---|---|
| 9,336,049 | B2 | 5/2016 | Kuraishi et al. |
| 2006/0184939 | A1 | 8/2006 | Sahoo et al. |
| 2009/0089772 | A1 | 4/2009 | Di Balsamo et al. |
| 2013/0247042 | A1* | 9/2013 | Bingham ............ G06F 9/45533 718/1 |
| 2014/0059228 | A1* | 2/2014 | Parikh ................ G06F 9/5005 709/226 |
| 2017/0147399 | A1* | 5/2017 | Cropper ............... G06F 9/4856 |

OTHER PUBLICATIONS

Tsafrir, D., et al, "Backfilling Using System-Generated Predictions Rather than User Runtime Estimates", IEEE Transactions on Parallel and Distributed Systems, Jun. 2007, pp. 789-803, vol. 18, No. 6.

Tsafrir, D., et al, "Modeling User Runtime Estimates", Job Scheduling Strategies for Parallel Processing—11th International Workshop, JSSPP 2005, Jun. 2005, 34 pages, vol. 3834 of the series Lecture Notes in Computer Science.

Tsafrir, D., et al, "The Dynamics of Backfilling: Solving in the Mystery of Why Increased Inaccuracy May Help", Proceedings of the 2006 IEEE International Symposium on Workload Characterization, IISWC 2006, Oct. 25-27, 2006, pp. 131-141.

* cited by examiner

AUTOMATIC RECONFIGURATION OF HIGH PERFORMANCE COMPUTING JOB SCHEDULERS BASED ON USER BEHAVIOR, USER FEEDBACK, AND JOB PERFORMANCE MONITORING

FIELD

The present application relates generally to computers, and more particularly to high performance computing systems, and resource scheduling on high performance computing systems.

BACKGROUND

High performance computing (HPC) clusters are managed by job schedulers that are configured with policies that define how users access resources to run their applications. Job scheduling policies and their configuration aim to achieve goals such as throughput, response time, utilization levels, and meeting deadlines. Generally, job schedulers require a human expertise to be configured for achieving good performance. Policies may influence user behavior with respect to job submission and required resources on HPC clusters. For example, HPC clusters have queues for jobs that take short duration to execute, for example jobs that run for less than 6 hours. These queues usually have higher priority than queues designated to hold jobs that take longer duration, for example, jobs that run for more than 10 hours. Given such policies with respect to different types of queues, users may prefer to submit their jobs to the queue with higher priority, for example, those holding short duration jobs. Users may also try to divide a job that generally takes longer duration to execute into smaller pieces, so that those jobs can be submitted to the short job queue, and therefore, receive priority in running those jobs. Another example policy may include allowing a job queue to have access to specialized resources such Graphical Processing Units. Based on such policy, a user may prefer one queue over another queue when submitting a job. Despite the policies, however, resources may be wasted, which in turn increases use of energy, requires additional acquisition and maintenance of machines, and delays user access to the machines.

BRIEF SUMMARY

A method and system of automatically reconfiguring a high performance computing job scheduler may be provided. The method, in one aspect, may include executing a job in a high performance computing system according to a current scheduler configuration, the job associated with a given user. The method may also include monitoring the executing job to determine the job's actual resource usage, the job's performance metrics and the job's completion. The method may further include monitoring a problem ticket system for an incoming problem ticket associated with the job. The method may also include, responsive to detecting the incoming problem ticket, reconfiguring the current scheduler configuration to increase one or more resources in the high performance computing system for submitted jobs associated with the given user. The method may also include, responsive to determining that the job completed executing, computing a difference between allocated resources allocated according to the current scheduler configuration at job submission for execution on the high performance computing system and the job's actual resource usage at the job's completion, wherein the difference is computed for each of N number of jobs that complete executing on the high performance computing system, wherein all of the N number of jobs are associated with a given user. The method may also include, responsive to determining that the difference for each of N number of jobs meets a criterion, reconfiguring the current scheduler configuration to reduce the allocated resources for the submitted jobs associated with the given user.

A high performance computing job scheduler system, in one aspect, may include at least one hardware processor executing a job in a high performance computing system according to a current scheduler configuration, the job associated with a given user. A storage device may be coupled to the at least one hardware processor and store scheduler configurations, from which the at least one hardware processor retrieves the current scheduler configuration. The at least one hardware processor may monitor the executing job to determine the job's actual resource usage, the job's performance metric and the job's completion. The at least one hardware processor may monitor a problem ticket system for an incoming problem ticket associated with the job. Responsive to detecting the incoming problem ticket, the at least one hardware processor may reconfigure the current scheduler configuration to increase one or more resources in the high performance computing system allocated for submitted jobs associated with the given user. Responsive to determining that the job completed executing, the at least one hardware processor may compute a difference between allocated resources allocated according to the current scheduler configuration at job submission for execution on the high performance computing system and the job's actual resource usage at the job's completion, wherein the difference is computed for each of N number of jobs that complete executing on the high performance computing system. Responsive to determining that the difference for said each of N number of jobs meets a criterion, the at least one hardware processor may reconfigure the current scheduler configuration to reduce the allocated resources, e.g., for the submitted jobs associated with the given user, and update the scheduler configurations stored in the storage device according to the reconfiguring.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
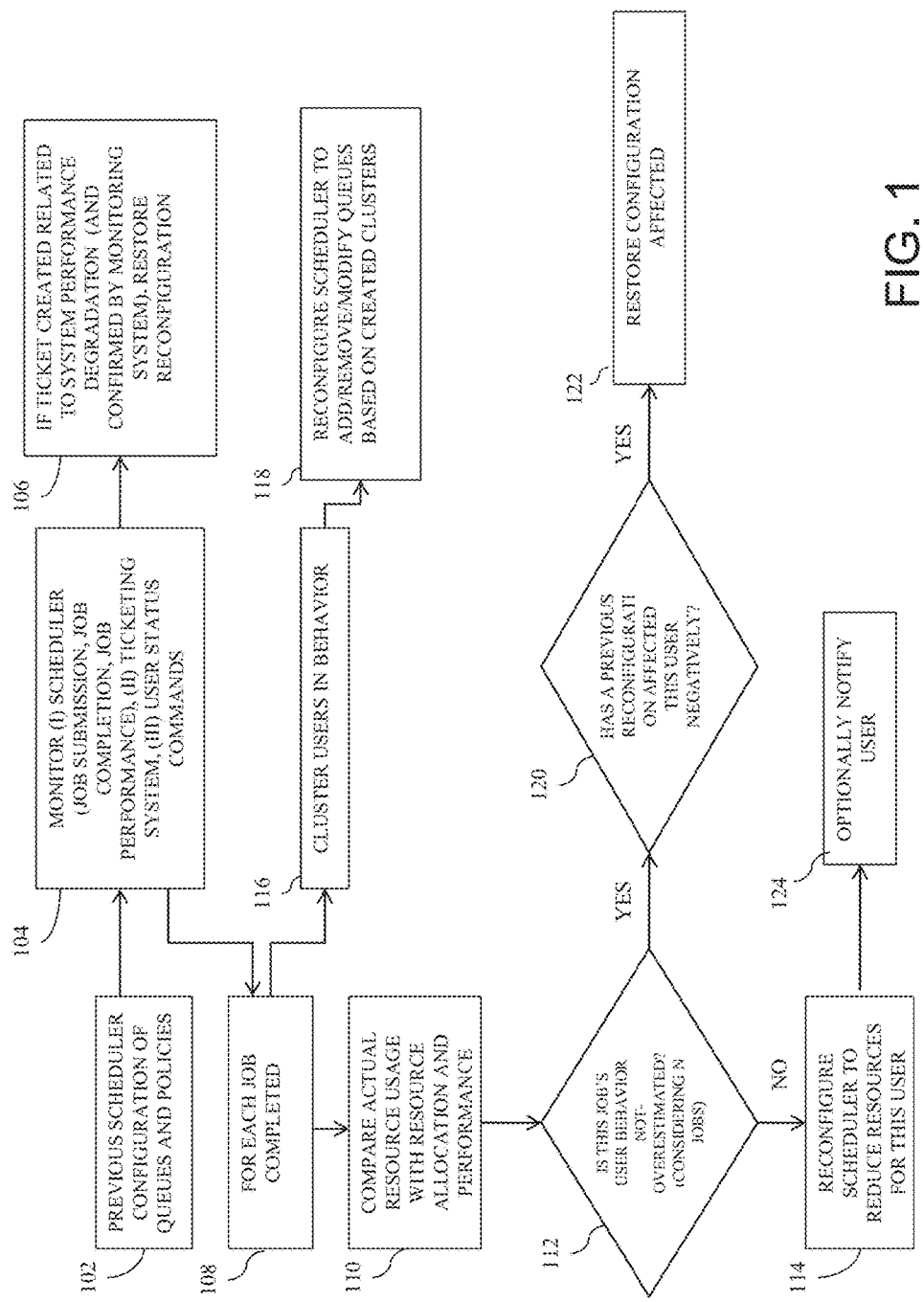
FIG. 1 is a flow diagram illustrating a method of the present disclosure in one embodiment.

A system and method may be provided that configure High Performance Computing (HPC) job (or process) queues based on user behavior, user feedback and actual usage of resources determined by job performance monitoring. The system and method may optimize one or more job schedulers of High Performance Computing (HPC) resources, for example, may implement a job scheduler component (e.g., a software component) that contains configurations and/or policies on how users (e.g., user applications) share computing resources to achieve a goal (e.g., response time or resource utilization) and receives user requests to access such resources. A job includes specification on how to run an application and specification of resources (e.g., network, processor, memory, and storage) that impact job performance. A job specification, for example, may indicate a number of processors, memory size, disk space size and type of communication network standard, for example: 12 processors, 4 GB of memory, 100 GB of disk space, and InfiniB and Network connecting all processors. As an example, consider Platform Load Sharing Facility (LSF), a scheduler commercialized by International Business Machines Corporation (IBM), Armonk, N.Y. In LSF a system administrator (sysadmin) may configure queues for different purposes. For example, an HPC cluster may be configured to have queues that have jobs that are only scheduled at night. In this example, although a user can submit jobs to this queue at any moment, the cluster will only execute them at night. As another example, suppose a user wants to submit a job that runs on all hosts of a cluster. The user can submit such a job by specifying that the user wants to use all processors available. A policy in the system may disallow this request on business days, but allow the request on weekends. The scheduler according to the policy will wait until a weekend to effectively execute such a job. If the cluster does not complete the job during the weekend, the scheduler suspends the user job until the next weekend.

The following shows an example queue configuration for a default queue (for Spectrum LSF):

```
Begin Queue
QUEUE_NAME = normal
PRIORITY = 30
NICE = 0
INTERACTIVE = NO
FAIRSHARE = USER_SHARES[[default,1]]
End Queue
```

The above queue configuration specifies a non-interactive queue (only runs batch jobs) with "low" priority. The scheduling priority is fairshare and the scheduler favors users that run few jobs over users that run many jobs.

The example below illustrates a queue configuration specified for interactive jobs. Since users have to be on the terminal to interact with their jobs, priority is higher. Also, this example queue only supports interactive jobs while still using fairshare scheduling:

```
Begin Queue
QUEUE_NAME = interactive
PRIORITY = 40
NICE = 0
INTERACTIVE = ONLY
```

-continued

```
NEW_JOB_SCHED_DELAY = 0
FAIRSHARE = USER_SHARES[[default,1]]
End Queue
```

A user of a system that includes the above example queue configurations may submit a normal job by entering the following command on a terminal:

$ bsub job

If a job is interactive, the user can submit the job with the "-I" switch, such as:

$ bsub -q interactive -I job

If the job is not interactive but the user tries to submit it to the interactive queue, the scheduler policy denies the job since the interactive queue only accepts interactive jobs and the scheduler does not submit the job.

The job scheduler component in one embodiment monitors the difference between user requested and actual resource usage in a job that is executed. Such difference is defined as user behavior. The job scheduler component in one embodiment also tracks the job's performance on a resource set. For instance, batch schedulers have capability to determine such differences. Systems commands may be invoked to determine actual resource usage. As an example, executing the command "time", available on UNIX-like reports the time a program consumed computing (user time), how much time it performed in the kernel performing Input/Output (I/O) operations, for example (system time), and the total time the program spent overall. Consider, the example below:

$ time ./a.out

./a.out 0,14s user 0,00s system 98% cpu 0,145 total

According to the output, the command above (a.out) took 145 ms to run. Of these, 140 ms was in doing computation and the other 5 ms doing memory allocations. In the above example command line, the "time" command calls the program (a.out) and then calls "wait4", which is a blocking system call that only returns when the child process finishes. When the child is finished, a data structure called "struct rusage" is filled with usage data that, among other things, includes the times described above. When the scheduler starts a job, the scheduler may call such command, e.g., "time", and once the job is completed, the scheduler can compare the requested run time with the actual run time, e.g., a subtraction (requested time−actual time). Other system commands may be invoked to determine other resource usage and compute the difference between the requested and actual resource usage.

The job scheduler monitoring component in one embodiment automatically modifies a scheduler configuration and/or policy to adapt the behavior of the job scheduler. The scheduler configuration and/or policy may be customized per user or per a plurality of users (e.g., a user group), e.g., based on (i) the behavior of jobs based on requested versus actual resource needs, and (ii) user perception of impact on jobs' performance and response time due to scheduler reconfiguration.

HPC job management systems, such as IBM Spectrum LSF, have the notion of user groups and user specific profiles for setting up personalized limits and policies. Once groups have been defined, systems administrators can configure specialized queues with different behaviors for different users. The same is valid for hosts and host groups. A system can be configured in a way such that, for example, only specific users can submit jobs to specific hosts. The following shows examples for a default LSF configuration:

Begin UserGroup

| GROUP_NAME | GROUP_MEMBER | USER_SHARES | #GROUP_ADMIN |
|---|---|---|---|
| #ugroup1 | (user1 user2 user3 user4) | ([user1, 4] [others, 10]) | #(user1 user2[full]) |
| #ugroup2 | (all) | ([user3, 10] [others, 15]) | #(user3[usershares]) |
| #ugroup3 | (ugroup1 user5 user6 user7) | ([user5, 16] [user6, 34] [user7, 15] [ugroup1, 40]) | #( ) |

End UserGroup
Begin User

| USER_NAME | MAX_PEND_JOBS | |
|---|---|---|
| #user1 | 800 | # user1 has pend threshold of 800 |
| #ugroup1 @ | 500 | # each user in ugroup1 has threshold of 100 |
| #ugroup1 | 1000 | # collectively ugroup1 has threshold of 1000 |
| #default | 100 | # default, any user/group has threshold of 100 |

End User

User feedback may be also considered in customizing the scheduler configuration and/or policy. User perception of impact can be added to the system by the User Interface component 206, in which users can provide their perception of their job's response time. Response time is defined as the time it took between job submission and completion and, includes the amount of time a job spent in the scheduler queue plus the time it took for the job to actually execute. The scheduler may measure such times by querying the system clock upon job submission, start of execution and end of execution.

FIG. 1 is a flow diagram illustrating a method of the present disclosure in one embodiment. At 102, jobs are executed according to a previous scheduler configuration of queues and policies. The flow diagram shown in FIG. 1 describes a process that is executed periodically, with the frequency, for example, defined by the systems administrators. Since the process starts with a previous configuration, the initial scheduler configuration may come from the default configuration that an HPC scheduler uses, or from the systems administrator customization of the system prior to the execution of the system in the present embodiment.

At 104, the job scheduler component monitors its job submission rate, computed from the number of jobs submitted per unit of time, job completion rate, computed from the number of jobs finished per unit of time, and job performance, the time it took for a job to finish. When a job completes, the system can gather information about the job for each machine it executed on. Information includes (e.g., populated in the struct rusage structure in UNIX-based operating systems) user time, system time, maximum resident size memory usage, amount of sharing of text segment memory with other processes, amount of data segment memory used, amount of stack memory used, number of soft page faults (those serviced by reclaiming a page from the list of pages awaiting reallocation), hard page faults (those that required I/O), number of times a process was swapped out of physical memory, number of input operations via the file system, number of output operations via the file system, number of Inter-Process Communication messages sent, number of Inter-Process Communication messages received, number of signals delivered, number of voluntary context switches (usually to wait for resources to be available), and number of involuntary context switches (usually because higher priority processes became runnable or the current process used up its time slice).

Ticketing system and user status commands are also monitored. For example, incoming tickets in a problem ticket system may be monitored to determine whether any of the problem tickets pertain to performance degradation in the jobs that are scheduled and executed according to the scheduler configuration specified at 102. For example, the monitoring takes place by having a daemon—a server process—periodically consulting the company's ticketing system and searching for performance degradation tickets. Such identification may be done, for example, by searching for a specific "degradation" category in the ticket system or by using text extraction algorithms. Once new entries are detected in the ticket system database, the monitoring process can check whether any of the ticket's author jobs have been affected by changes in the scheduling system—in a previous configuration, the job would have been scheduled in a determined way, whereas with the new configuration the job may have been scheduled in a different way.

At 106, if it is determined that a problem ticket is created because of a system performance degradation caused by a scheduling system reconfiguration, the scheduler configuration may be restored to a previous state. In case the system is using the default configuration (initial configuration at the first iteration before any configuration changes), there is no state to return to, as, by definition, performance has not degraded. The restoration to a previous state can be made by maintaining a list of all the changes made to the scheduler configuration. For example, the changes made to the scheduler configuration may be maintained in a source control system. The scheduler configuration that is changed or restored is for a given user's jobs (e.g., those submitted by the given user), wherein the problem ticket that is detected is related to a job of the given user. For example, from the detected problem ticket, a user associated with the job that is the subject of the problem ticket may be determined, and the scheduler configuration may be changed for jobs that are submitted by that user.

In one embodiment, the flow at 104 is executed asynchronously and periodically. From it, two parallel flows can start, one going to 106, and another going to 108-124. In one embodiment, a monitoring daemon periodically checks the system performance and support tickets at 104, and at 106 the monitoring daemon checks whether performance degradations and user support tickets were created.

At 108, for each job that is completed (determined from monitoring the job completion at 104), the processing at 110, 112, 114, 116, 118, 120, 122, and 124 may be performed.

At 116, user behavior over time, e.g., the amount of resources requested for each job (the user submits) and the actual resource usage, is clustered by a clustering algorithm, such as k-means or Gaussian Mixture Models. These clustering algorithms can use resource usage levels considering central processing unit (CPU), memory, network, and disk space.

At 118, based on created clusters, the job scheduler reconfigures its configuration, for example, adds, removes, and/or modifies a job queue that includes scheduled jobs.

In one embodiment, the processing flow from 108 to 116 may be performed in parallel with the process flow from 108 to 110, for example, 116 and 110 may be executed in any order, or in parallel.

At 110, for the job that is being considered (a completed job at 108), the actual resource usage by the job and the allocated (requested) resource for the job are compared. Run-time performance of the job is also compared by measuring the new execution time and comparing it with a previously-recorded execution time (if it exists).

At 112, it is determined whether the allocated (requested) resources and the actual resource usage are substantially similar. For instance, if the difference between the actual resource usage by the job and the allocated (requested) resource for the job is within a threshold value, it may be determined that the allocated (requested) resources and the actual resource usage are substantially similar. For example, requested resources−used resources=0 or another defined minimal value. In this case, good behavior (not-overestimated behavior) is found, otherwise, the behavior may be defined as overestimated behavior. In one embodiment, a predefined number of jobs (N jobs) may be considered in determining whether user behavior should be defined to be overestimated. For example, only if after N number or more of jobs are all found to have the difference values that are greater than the threshold value (e.g., 0 or another defined minimal value), the user behavior may be defined to be overestimated.

If it is determined that the user behavior is overestimated (e.g., if it is determined that the allocated (requested, e.g., as a result of user requesting) resources are larger than the actual used resources (e.g., requested resources−used resources>0 or the threshold value) for one or a defined N number of jobs), then at 114, the scheduler configuration is reconfigured to reduce the resources for this user, for example, for jobs submitted by this user. For instance, the resources may be reduced to the actual used resources, or example a percentage or fraction of the difference.

At 120, based on the comparison at 110, if it is determined that a system reconfiguration in a previous iteration for this user affected performance, a previous configuration may be reverted. If the previous configuration did not affect the job performance negatively, no action is taken, and the logic may return, for example to 108 to process another job performance.

At 122, the previous configuration is reverted. For example, a system recorded history of changes may be accessed, and the configuration may revert back to a configuration immediately before the current configuration.

The resources may be reduced at a ratio, for example, at a predefined X ratio based on application performance of a previous execution. That way, in one embodiment, if a user was able to allocate 100 processors in a previous execution, but that was an over-estimation (over-estimated user behavior) and the system is configured to decrease access by 10%, then the maximum number of processors this user is able to allocate may be reduced to 90. Additionally, other resources can be verified, such as requested memory usage, number of Graphics Processing Units, and the number of jobs that can be submitted to the system at a single time.

At 124, the job scheduler component may notify the user that the resources have been reduced. In another embodiment, the job scheduler may reduce the resources without notifying the user.

The processing performed according to the method shown in FIG. 1 may be executed continuously as the HPC system schedules and executes jobs continuously. For instance, the initial scheduler configuration shown at 102 would represent a current configuration used in the current iteration, for example, configured from an immediate previous iteration of the method.

Figure 2:
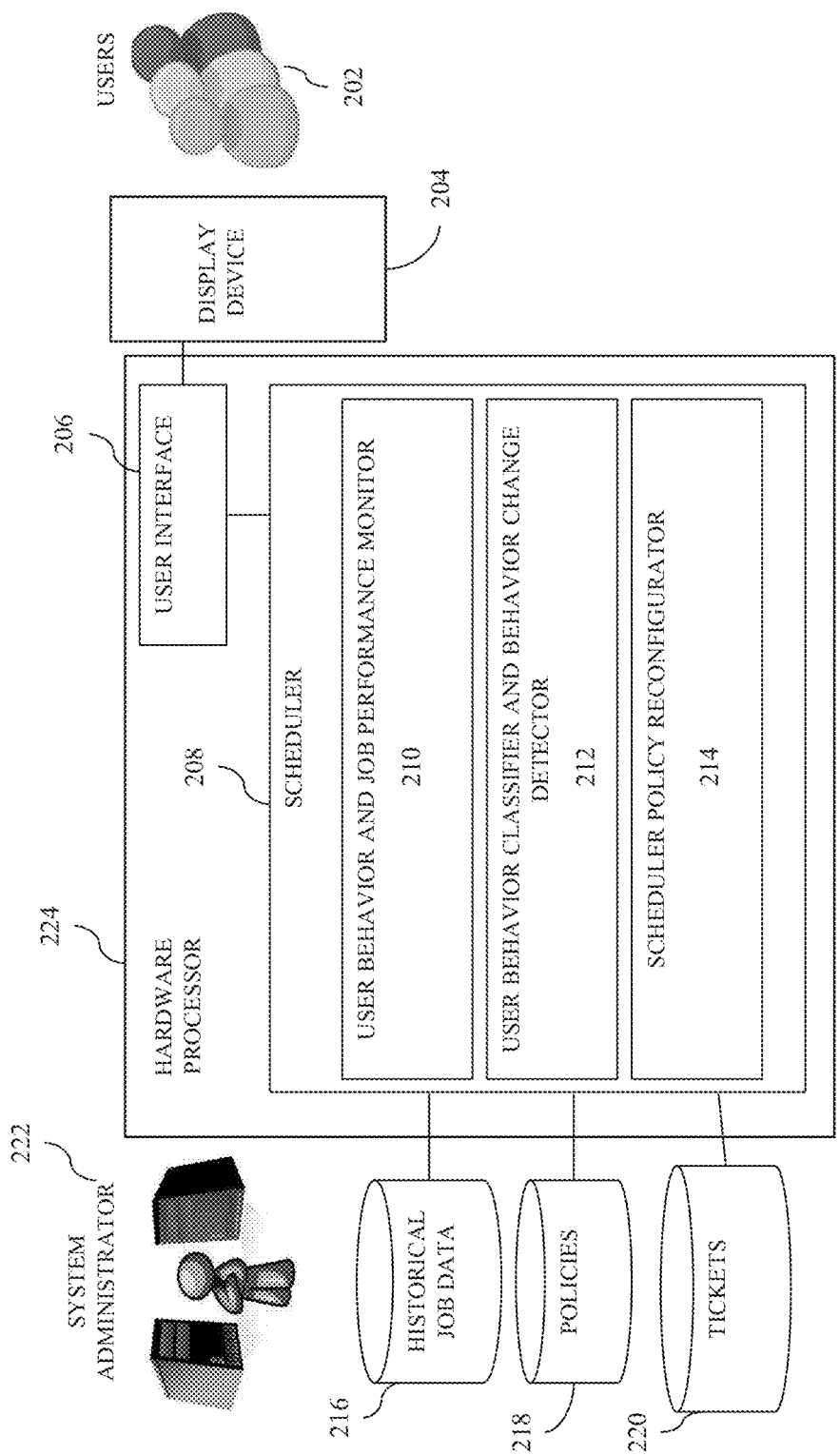
FIG. 2 is a diagram showing components of a system of the present disclosure in one embodiment.

FIG. 2 is a diagram showing components of a system of the present disclosure in one embodiment. A user 202 may perceive priority of a job according to how important the user thinks the user's jobs are relative to the user's peers and also relative to how a system administration 222 may think. Job ratings allow users to rank and rate each others' jobs (a technique known as collaborative filtering) when a system is busy. A recommendation system may allow user to input information such as which queues and/or hosts deliver effective results as perceived by the user. With such ratings, the recommendation system can use the collaborative filter to rank jobs according to the value perceived by users, allowing scheduler reconfigurations to be more relevant to users. The system may receive input, for example, via a ticketing system that stores in a database 220 problem tickets generated by users or system generated problem tickets, and also via a user interface 206 displayed on a display device 204. A user may specify via a user interface 206 information such as "my job is 30% slower than usual" and "my job is aborting after 5 minutes of execution".

A job scheduler 208 may be executing on one or more hardware processors 224, and may include a user behavior and job performance monitor or functionality 210, a user behavior classifier and behavior change detector or functionality 212, and a scheduler policy reconfigurator or functionality 214. The user behavior and job performance monitor or functionality 210 may monitor executing jobs and their performance. The jobs are executed according to a scheduling configuration and policy 218 stored in a database, for example, stored in a storage device. At the completion of each job, the user behavior and job performance monitor 210 may compute or determine the user behavior associated with the job (e.g., the difference between the requested or allocated resources and the actual resources used by the job). The performance of the job, for example, throughput, speed and other performance related data is determined. If no problems have been registered via the ticket system, or the job completes successfully (e.g., detected by a cluster management system automatically), then the performance of the job is considered to be satisfactory. The user behavior (determined based on the difference between the requested and actual usage of resources) and the performance determined for the job is stored in a job database 216, e.g., historical job data database, stored in a storage device. As an example, data such as CPU, memory, disk, and network utilization associated with executing jobs may be monitored and determined. This data is the actual utilization of the resources, which is compared against what the user requested. The difference determines whether a user's behavior is an overestimated behavior or not-overestimated behavior.

The user behavior classifier and behavior change detector 212 may determine or compute user behavior. For example, user behavior classifier and behavior change detector 212 computes the difference between the allocated resources requested by a user and the actual resources used by the job. If N number of jobs (all associated with the user) has the difference value greater than zero or another defined threshold value, the user behavior classifier and behavior change detector 212 may classify the user behavior as being overestimated or an overestimation. N may be configurable, and may be defined as any number between 1 to a defined or configure positive integer. This component also detects behavior changes. For example, if the user usually asks for 12 processors, but the CPU utilization level of the user's job is 50% it means this user's behavior is overestimated behavior (the user overestimated the resources required to run the user's job). If the user's job starts to request 8 processors, and the CPU utilization level jumps to 80%, the behavior is improving, and the change in behavior (in this example, improvement) is detected by the "change detector".

The scheduler policy reconfigurator 214 may reconfigure the current scheduling configuration and/or policy 218 related to jobs associated with the user, responsive to determining that the requested or allocated resources for the job was an overestimation of the needed resources, for example, the amount of the requested or allocated resources is larger than the actual resources used by the job by more than a threshold amount (e.g., for N number of jobs).

In one aspect, the scheduler 208 may also determine by monitoring a ticketing system's tickets 220, whether the current scheduling configuration/policies are an underestimation. For instance, if tickets are generated during the execution of the jobs according to the current scheduling configuration and/or policies, the tickets indicating problems related to computing resources and performance of the job, the scheduler 208, for instance, via the scheduler policy reconfigurator 214, reconfigure the current scheduling configuration and/or policies to increase the resources. For example, if the user usually asks for 12 processors, but the CPU utilization level of the user's job is 50%, this may mean that the user overestimated the resources required to run the job, implying behavior that is overestimated. If the user's job starts to request 4 processors, and the CPU utilization level jumps to 100%, the user may detect poor performance in executing the job because the resources may be underestimated. In this case, the user may, for instance, generate in the ticket system a problem ticket specifying that the performance of the computing resources is poor. As another example, the system may automatically generate a ticket specifying poor performance, responsive to detecting that the job's performance is not up to a standard.

Figure 3:
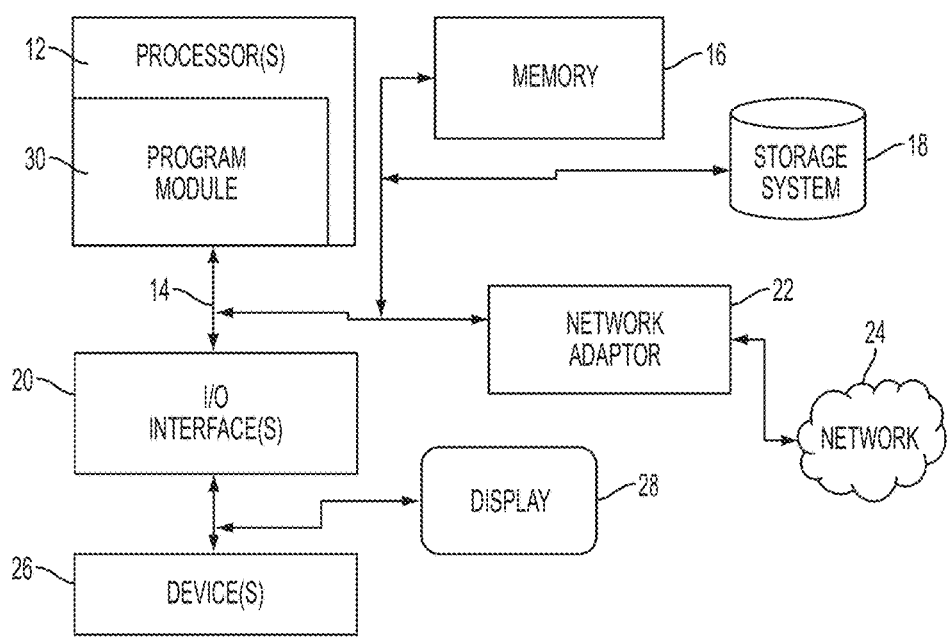
FIG. 3 illustrates a schematic of an example computer or processing system that may implement a job scheduling system in one embodiment of the present disclosure.

FIG. 3 illustrates a schematic of an example computer or processing system that may implement a job scheduling system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage device storing a program of instructions executable by a machine to perform a method of automatically reconfiguring a high performance computing job scheduler, the method comprising:
   executing a job in a high performance computing system according to a current scheduler configuration, the job associated with a given user;
   monitoring the executing job to determine the job's actual resource usage, the job's performance metric and the job's completion;
   monitoring a problem ticket system for an incoming problem ticket associated with the job;
   responsive to detecting the incoming problem ticket, reconfiguring the current scheduler configuration to increase one or more resources in the high performance computing system allocated for submitted jobs associated with the given user;
   responsive to determining that the job completed executing, computing a difference between allocated resources allocated according to the current scheduler configuration at job submission for execution on the high performance computing system and the job's actual resource usage at the job's completion, wherein the difference is computed for each of N number of jobs that complete executing on the high performance computing system; and
   responsive to determining that the difference for said each of N number of jobs meets a criterion, reconfiguring the current scheduler configuration to reduce the allocated resources for the submitted jobs associated with the given user.

2. The computer readable storage device of claim 1, wherein the criterion includes the difference being greater than a predefined threshold value.

3. The computer readable storage device of claim 1, further comprising notifying the given user associated with the job that the allocated resources for the job have been reduced.

4. The computer readable storage device of claim 1, wherein N is a configurable positive integer.

5. The computer readable storage device of claim 4, wherein N is one.

6. The computer readable storage device of claim 4, wherein N is greater than one.

7. The computer readable storage device of claim 1, wherein responsive to determining that the job's performance metric is degraded, reconfiguring the current scheduler configuration to increase the allocated resources.

8. A high performance computing job scheduler system comprising:
   at least one hardware processor executing a job in a high performance computing system according to a current scheduler configuration, the job associated with a given user;
   a storage device coupled to the at least one hardware processor and storing scheduler configurations, from which the at least one hardware processor retrieves the current scheduler configuration;
   the at least one hardware processor monitoring the executing job to determine the job's actual resource usage, the job's performance metric and the job's completion;
   the at least one hardware processor monitoring a problem ticket system for an incoming problem ticket associated with the job;
   responsive to detecting the incoming problem ticket, the at least one hardware processor reconfiguring the current scheduler configuration to increase one or more resources in the high performance computing system allocated for submitted jobs associated with the given user;
   responsive to determining that the job completed executing, the at least one hardware processor computing a difference between allocated resources allocated according to the current scheduler configuration at job submission for execution on the high performance computing system and the job's actual resource usage at the job's completion, wherein the difference is computed for each of N number of jobs that complete executing on the high performance computing system; and
   responsive to determining that the difference for said each of N number of jobs meets a criterion, the at least one hardware processor reconfiguring the current scheduler configuration to reduce the allocated resources for the submitted jobs associated with the given user, and updating the scheduler configurations stored in the storage device according to the reconfiguring.

9. The system of claim 8, wherein the criterion includes the difference being greater than a predefined threshold value.

10. The system of claim 8, wherein the at least one hardware processor notifies the given user associated with the job that the allocated resources for the job have been reduced.

11. The system of claim 8, wherein N is a configurable positive integer.

12. The system of claim 11, wherein N is one.

13. The system of claim 8, wherein responsive to determining that the job's performance metric is degraded, the at least one hardware processor reconfiguring the current scheduler configuration to increase the allocated resources.

* * * * *